Jan. 15, 1924.
R. KOCH
1,480,764
ELECTRIC ACCUMULATOR OR BATTERY FOR MINERS' SAFETY ELECTRIC LAMPS
Filed Feb. 9, 1923   2 Sheets-Sheet 1
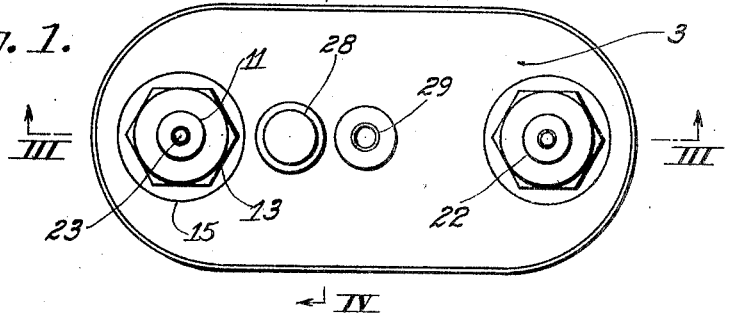
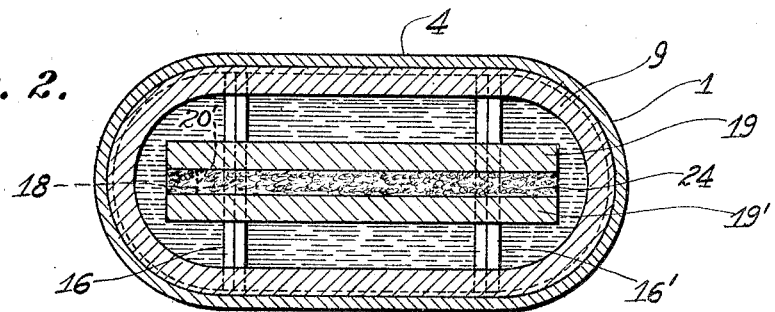
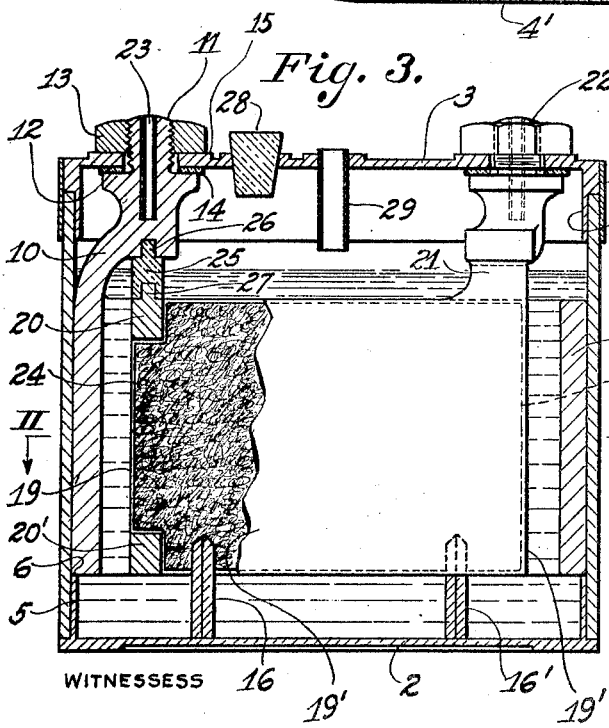
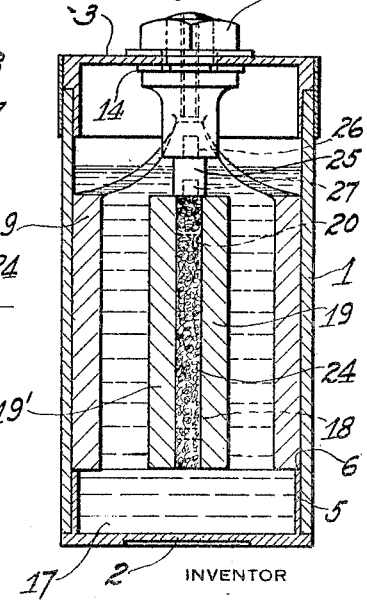

Jan. 15, 1924. 1,480,764
R. KOCH
ELECTRIC ACCUMULATOR OR BATTERY FOR MINERS' SAFETY ELECTRIC LAMPS
Filed Feb. 9, 1923 2 Sheets-Sheet 2
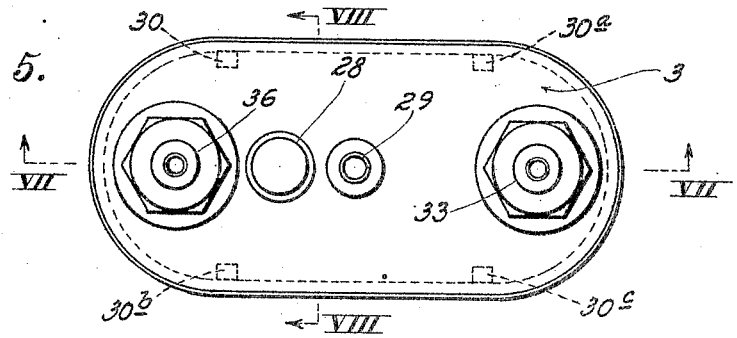
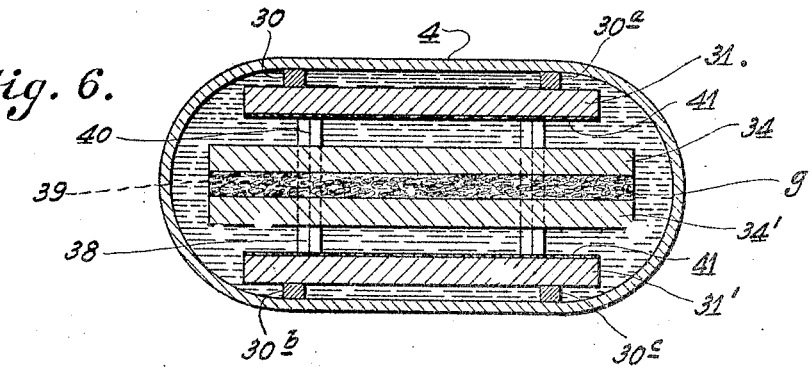
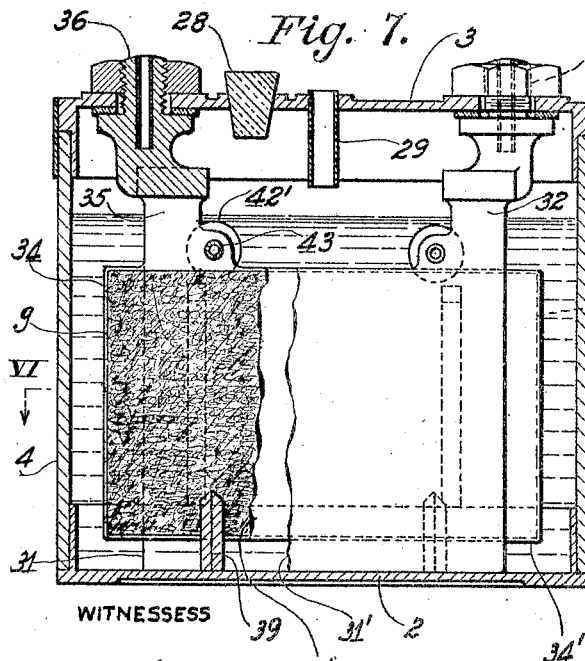
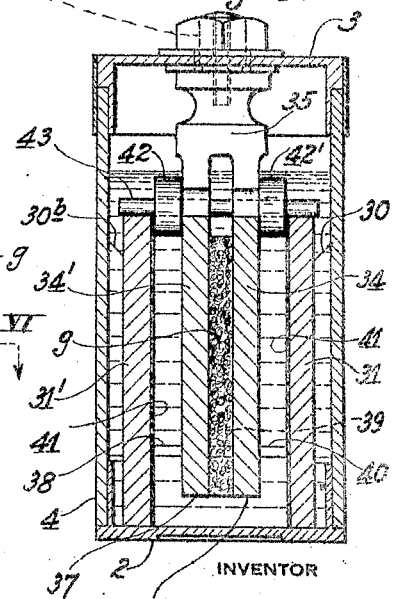
WITNESSES
C. R. Halbert
A. B. Wallace
INVENTOR
Richard Koch
By Winter & Brown
His Attys Patented Jan. 15, 1924.

1,480,764

UNITED STATES PATENT OFFICE.

RICHARD KOCH, OF PITTSBURGH, PENNSYLVANIA.

ELECTRIC ACCUMULATOR OR BATTERY FOR MINERS' SAFETY ELECTRIC LAMPS.

Application filed February 9, 1923. Serial No. 617,980.

*To all whom it may concern:*

Be it known that I, RICHARD KOCH, a citizen of Germany, and a resident of Pittsburgh, in the county of Allegheny and State of Pennsylvania, have invented a new and useful Improvement in Electric Accumulators or Batteries for Miners' Safety Electric Lamps, of which the following is a specification.

This invention relates to an accumulator or battery, and particularly to one designed for use in conjunction with mining appliances, such as miners' safety electric lamps, especially the type in which the lamp is carried upon the miner's cap, or other similar devices.

In devices of this general character, in which the container for the battery is carried in a casing suspended from the miner's belt, considerable difficulty has been experienced in maintaining such batteries perfectly acid-proof and fitted to withstand the abusive handling and willful ill-treatment to which such lamps are subjected in heavy mine duty. Moreover, a constant source of annoyance in using wet batteries provided with liquid electrolyte, has been the fact that if during operation the battery is placed in a diagonal position, thereby reducing the area of the electrodes immersed in the electrolyte, the output diminishes. It is the principal objects of the invention to provide a complete battery for miners' safety electric lamps which is free of the objections noted, which is safe and so constructed as to substantially preclude leakage of electrolyte, thus eliminating damage to material or to the clothing and skin of the bearer of the lamp due to spillage of acid.

In the wet battery separators made from insulating material are commonly employed for holding the plates of opposing polarity from actual contact with each other. Usually a battery-cell consists of two groups of plates or electrodes of opposing polarity immersed in an electrolyte, and kept from electrical contact with each other by means of these insulating separators placed between the opposing plates. Spillage of liquid-acid with the consequent damage to the material, clothing or skin of the bearer may be prevented, and the desired permanent level of electrolyte can be constantly maintained by employing a so-called "solidified" or gelatinous electrolyte, the same being of any desired nature provided it possesses the usual physical characteristics of such electrolytes. The employment of insulating separators of the described character between the plates in connection with solidified electrolyte, however, has been found to be detrimental with batteries for lamps used in heavy mine duty, requiring repeated charging and discharging, since such separators between the plates interfere with proper penetration of the dry electrolyte causing the development of cracks in the electrolyte and preventing correct surface-contact between electrodes and electrolyte.

Another object of the invention, therefore, is to provide an accumulator for miners' electric lamps, with which a solidified electrolyte may be successfully employed, and in which the groups of opposing plates are properly spaced in working position, without the employment of insulators or separators between the plates, as above explained.

Special objects of the invention are to provide a device employing solid electrolyte in which the maximum effective surfaces of the electrodes are exposed, so as to increase the capacity without increasing the size of the battery, one in which the space intermediate the electrodes is unobstructed and free, one in which the internal resistance is diminished to a minimum, and one in which the electrolyte itself assists in properly spacing the electrodes, and in bracing and strengthening the entire structure.

It is also a special object to provide a device of the character referred to in which the several parts are of such nature, and are so associated, that the entire structure will present a substantially solid unit, reducing the dangers of short-circuiting frequently caused by warping or buckling of the electrodes, and it is also a special object to support the electrodes from both the top and bottom of the container, and to space the same at a distance above the said bottom.

These and other objects of the invention will more fully appear when taken in conjunction with the following description and the appended claims.

In the accompanying drawings, Fig. 1 is a top plan view of the preferred embodiment of the invention; Fig. 2 a horizontal sectional view taken on the line II—II of Fig. 2; Fig. 3 a vertical sectional view taken on the line III—III of Fig. 1; Fig. 4 a vertical sectional view taken on the line IV—IV of Fig. 1; Fig. 5 a top plan view of a modified form of the invention; Fig. 6 a horizontal sectional view taken on the line VI—VI of Fig. 7; Fig. 7 a vertical sectional view taken on the line VII—VII of Fig. 5; and Fig. 8 a transverse vertical section taken on the line VIII—VIII of Fig. 1.

The container for the electrodes and electrolyte comprises the tubular vertical side wall 1, the bottom 2, and the closure top 3, all of which are preferably made of celluloid, so as to render the same transparent for purposes of observing the internal action without disassembling the parts. The container is elongated in horizontal cross section providing opposite portions 4, 4', which lie in substantial parallelism, as clearly shown in Figs. 1 and 2. The bottom closure 2 is formed with an upwardly extending flanged portion 5, which cooperates with the lower margin of the vertical wall to form a supporting ledge 6. The closure top 3 has a similarly formed depending flanged portion 7, which is adapted to telescopically engage the inner surface of the vertical wall at its extreme upper portion, and the top is ultimately sealed in place after assembly of the parts by means of an encircling band 8, which is securely attached as by gluing, to both the top and vertical wall.

Snugly fitting within the container, and seating upon the supporting ledge 6, in the embodiment illustrated in Figs. 1 to 4, is a tubular negative electrode 9, the cross-sectional shape of the electrode corresponding to that of the vertical wall of the container, so as to be held therewithin without danger of relative lateral movement between the said electrode and container. Extending upwardly at one end of the electrode 9 is a plate-strap 10, the upper extremity of which forms a reduced terminal post 11, the juncture between the post and strap providing a shoulder 12. This terminal post is externally threaded and projects through and fits within a suitably formed aperture in the closure top, and is provided with a terminal nut 13 for holding the parts in place. An insulating, cushioning rubber washer is interposed between the shoulder 12 and the top 3, as indicated at 14, and the top is thickened to form a reinforcing boss 15 abutting the said nut.

Fixed to the bottom 2, and projecting upwardly therefrom, is a pair of supporting rests 16, 16'. These rests are preferably formed by uniting strips of celluloid, as clearly indicated in the drawings, and comprise a rectangular body portion 17, corresponding in height to the supporting ledge 6, and are of sufficient width to bridge the entire space between the oppositely facing portions of the flange 5, the upstanding finger 18 being provided midway of the ends of the body 17, for a purpose to be subsequently described.

Disposed within the shell formed by the negative electrode, and adapted to be held in a plane corresponding to the longitudinal axis of the container, is a positive electrode made up of the spaced plates 19, 19'. These plates are connected at one side, as illustrated in Fig. 3, by integral bridge-lugs 20, 20', and are also connected at their upper portions at the side opposite the lug 20 by means of the plate-strap 21, similar in construction to the plate-strap 10, terminating in the terminal plug 22 which is attached to the closure top 3 in the same manner as previously pointed out in connection with the terminal plug of the negative electrode, each of the terminal plugs being provided with an axial, cylindrical bushing 23 for the reception of the terminals of the usual conductors.

The recess left between the plate sections 19, 19' of the positive electrode is filled with a layer 24 of spun glass cotton, except at the points at which the upstanding fingers 18 project therewithin. The lower edges of the positive electrode are adapted to seat upon the upper edge of the supporting rest 17, with the finger 18 projecting between the plate sections 19, 19', so as to positively anchor the electrode against lateral movement, and in spaced relation with the parallel portions 4, 4' of the negative electrode.

It is thus seen that the negative electrode forms a unitary structure, and the connecting of the plate sections 19, 19' by means of the bridge lugs 20, 20', and the plate-strap 21, also renders the positive electrode a unit. In order to connect the two electrodes, forming a united, mechanical structure which is strongly braced, an insulating spacer 25 is interposed between the bridge lug 20 and the plate-strap 10, said spacer being positioned by a reduced nipple portion 26, fitting within a correspondingly shaped depression in the strap 10, and a similarly formed nipple 27 engaging a depression in the lower face of the spacer.

The closure top 3 is provided with a filling opening, closed by a plug 28, and with a depending celluloid vent tube 29, which provides a means for the escape of the gases generated during charging of the battery.

A so-called "solidified" or gelatinous electrolyte is employed, the same being of any desired nature, provided it possesses the usual physical characteristics of such electrolytes. The electrolyte is introduced through the filling opening closed by the plug 28, and is adapted to completely fill all of the spaces not only between the adjacent faces of the two electrodes, but all of the recesses left between the several parts. Before the accumulator is filled with the solid electrolyte, the same is fully charged with a liquid electrolyte. The liquid electrolyte is then removed and replaced by the solid electrolyte, for instance, by sulphuric acid mixed with water glass. Accumlators thus treated not only retain practically the same capacity as those with liquid electrolyte, but also have less tendency to develop cracks in the solid electrolyte and consequently form short circuits. This, in conjunction with the secure bracing and positioning of the several parts, as previously described, results in a structure which is substantially solid throughout its entire extent, thus providing a structure in which the dangers of developing short circuits frequently caused by the warping or buckling of the electrodes is eliminated, and provides a device capable of withstanding severe mechanical abuse without breakage. It is noted that the method of mounting the negative electrode snugly within the casing, and the supporting and positioning of the positive electrode, as set forth, leaves substantially the entire space between the adjacent faces of the positive and negative electrodes free and unobstructed. Due to the elimination of parts between the electrodes, the efficiency of the battery is not only increased, but the proportions of the electrodes themselves may be made greater, without adding to the size of the entire device, and the dry electrolyte may be more successfully employed without cracking, as above noted, and maintains better surface contact with the electrodes.

In the modified form, illustrated in Figs. 5 to 8, a similar container is employed to that used in connection with the preferred form, with the exception that vertical ribs 30, $30^a$, $30^b$, $30^c$ are attached to and extend throughout a portion of the height of the vertical wall of the container, and that a slightly different form of supporting rest is attached to the bottom closure. In this form, the negative electrode is not tubular, but consists of two plates 31, 31', connected at one side of their upper edges by the plate-strap 32, the plates 31, 31', being thus connected to form a unitary structure, which is adapted to snugly fit within the container abutting the rubs 30 to $30^c$. The upper extremity of the strap 32 forms a terminal post 33, corresponding to the terminal post of the first described form, and is connected to the top closure 3 in a similar manner.

The positive electrode comprises two spaced plates 34, 34', which are joined at one end of their upper edges by the plate-strap 35, the upper extremity thereof forming the terminal post 36. The lower portions of plates 34, 34', seat within notches 37, 37', formed between the upstanding fingers 38, 39 and 40 of the supporting rests, the dimensions of said fingers being sufficient to bridge the space between the electrodes and the plates 34, 34', when the parts are in assembled relation. finger 39 projecting within the lower portion of the recess between the said plates. A layer of spun-glass cotton $g$ is interposed between the sections of the positive electrode, as in the preferred form.

In this modified embodiment, the negative electrode does not seat upon the ledge formed by the thickened portion of the vertical wall, but seats directly upon the bottom closure, as clearly illustrated in Fig. 8, and the inner surface of each of the plates 31, 31', facing the plates of the positive electrode, is covered by a thin sheet of wood 41 for the purpose of better retaining the active material within the grid. This sheet is preferably made of cypress wood, which is treated to render the same porous and to remove the natural wood acid therefrom. The lower extremities of the several plates comprising the electrodes are held in properly spaced relation and braced by means of the supporting rests just described, as well as by contact of the lower edges of the negative electrode with the bottom closure. The upper portions of the electrodes are spaced and braced by means of solid rubber discs 42, 42', which are positioned by means of tubes 43 of insulating material, preferably made of celluloid. After the electrodes have been assembled in position, as shown in the drawings, the container is filled in the manner set forth with the solidified or gelatinous electrolyte, which completely fills all of the spaces and recesses between the several parts, co-acting with the same to form a substantially solid construction.

The various parts of the modified form corresponding to those shown and described in connection with the preferred form, unless specially referred to, have been designated by the same reference characters.

It is thus seen that the invention provides an accumulator or battery which is very compact and sturdy in construction, one in which substantially the entire space between the positive and negative electrodes is free and unobstructed, one in which the capacity is increased due to the maximum effective surfaces of the electrodes exposed and the unrestricted action of the electrolyte thereon, one which is capable of withstanding extreme mechanical abuses due to the novel method of spacing and bracing the several parts in conjunction with the nature of the electrolyte employed, and one which has inherently a long life due to the employment of a small number of thick plates.

I claim:

1. An electric accumulator comprising a container, positive and negative electrodes disposed in spaced relation in said casing, with substantially the entire space between adjacent faces of said electrodes free and unobstructed, the negative electrode comprising spaced portions forming a unit which snugly fits the interior of the container whereby to prevent lateral movement therein, the said positive electrode comprising two spaced plates rigidly connected at their tops to form a unitary structure disposed intermediate the said portions of the negative electrode, a terminal post projecting upwardly from the connection between the said plates and fitting within an aperture in the top closure of the container whereby to anchor the same against lateral movement, a supporting rest upon which the lower portions of the positive electrode plates seat, said rest being provided with an upstanding finger bridging the gap between said plates to anchor the same against lateral movement, and a solid electrolyte filling the spaces between the several parts whereby to form a solid, rigid and unitary structure.

2. An electric accumulator or battery comprising a container having a tubular vertical wall, a negative electrode of tubular form snugly fitting the interior of the container wall whereby to anchor the same against relative lateral movement therein, a positive electrode disposed within but spaced from the negative electrode, substantially the entire space between the electrodes being free and unobstructed, means for anchoring both the upper and lower edges of the positive electrode against lateral movement, and a solid electrolyte filling the spaces between the several parts whereby to form a solid, rigid and unitary structure.

3. An electric accumulator or battery comprising a container having a tubular vertical wall, a negative electrode of tubular form snugly fitting the interior of the container wall whereby to anchor the same against relative lateral movement therein, a positive electrode disposed within but spaced from the negative electrode, substantially the entire space between the electrodes being free and unobstructed, a terminal post projecting upwardly from the positive electrode and fitting an aperture within the top closure of the container whereby to anchor the same against lateral movement, a supporting rest upon which the lower edge of the positive electrode seats, said rests being provided with an upstanding finger extending within a recess in said electrode to anchor same against lateral movement, and a solid electrolyte filling the spaces between the several parts, whereby to form a solid, rigid and unitary structure.

4. An electric accumulator or battery comprising a container having a tubular vertical wall portions of which lie substantially parallel to each other, a negative electrode of similar tubular form snugly fitting the interior of the container, a positive electrode disposed within but spaced from the negative electrode, substantially the entire space between the electrode being free and unobstructed, the positive electrode comprising two spaced plates rigidly connected at their upper edges, a terminal post projecting upwardly from the said connection and fitting an aperture in the closure top of the container, a supporting rest fixed to the bottom of the container upon which the plates of the positive electrode seat, said rest having a finger extending into the recess between the plates to anchor the same against lateral movement, and a solid electrolyte filling the spaces between the parts, whereby to form a rigid, solid and unitary structure.

5. An electric accumulator or battery comprising a container having a bottom, a closure top, and a tubular side wall, the side wall being thickened for a slight distance above the bottom to provide a supporting ledge, a tubular negative electrode corresponding in shape to the side wall of the container snugly fitting the same and resting upon said ledge, a positive electrode disposed within the negative electrode but spaced therefrom, substantially the entire space between the electrodes being free and unobstructed, a terminal post extending from the upper portions of the positive electrode and projecting through an aperture in the closure top, a supporting rest fixed to the bottom of the container upon which the lower edge of the positive electrode seats, said rest being provided with a finger engaging a recess in the said electrode to anchor same against lateral movement, and a solid electrolyte filling the spaces between the several parts, whereby to form a solid, rigid and unitary structure.

In testimony whereof, I sign my name.

RICHARD KOCH.

Witness:
EDWIN O. JOHNS.